United States Patent [19]

Gebelius

[11] 3,981,322
[45] Sept. 21, 1976

[54] PIPE CONNECTING DEVICE

[76] Inventor: Sven Runo Vilhelm Gebelius, Fridhemsgatan 27, Stockholm, Sweden, S-11240

[22] Filed: Sept. 8, 1975

[21] Appl. No.: 611,320

Related U.S. Application Data

[63] Continuation of Ser. No. 481,471, June 20, 1974, abandoned.

[30] Foreign Application Priority Data

June 25, 1973 Sweden .............................. 7308865

[52] U.S. Cl. ............................. 137/318; 137/322
[51] Int. Cl.² ......................................... F16K 51/00
[58] Field of Search ............. 137/15, 315, 318, 322, 137/320; 285/197

[56] References Cited
UNITED STATES PATENTS

| | | | |
|---|---|---|---|
| 2,955,595 | 10/1960 | Semple ........................... | 137/318 X |
| 3,580,269 | 5/1971 | Ehrens .............................. | 137/318 |

Primary Examiner—Alan Cohan
Attorney, Agent, or Firm—Holman & Stern

[57] ABSTRACT

A method and means for connection of crosswisely extending pipe connections at a longitudinally extending transport pipe for fluid, gas or similar media. The method and the means involves the attachment of two separate parts in an embracing relationship to the transport pipe, thus forming a body for the connection means, said body including a guiding channel directed towards the transport pipe and in which a hole piercing member is movably arranged, the hole piercing member being arranged to take up a hole under the influence of an applied force. The guiding channel communicates with one or more flow channels leading to pipe connection members at the outside surface of the body, the hole piercing member serving as a valve seat and the edge of the hole serving as a valve face, the hole piercing member being arranged with an adjusting member for movement in direction to and from the hole in the wall of the transport pipe, thus acting as a flow restricting valve for flow from the transport pipe to pipes connected to the pipe connection members.

1 Claim, 5 Drawing Figures

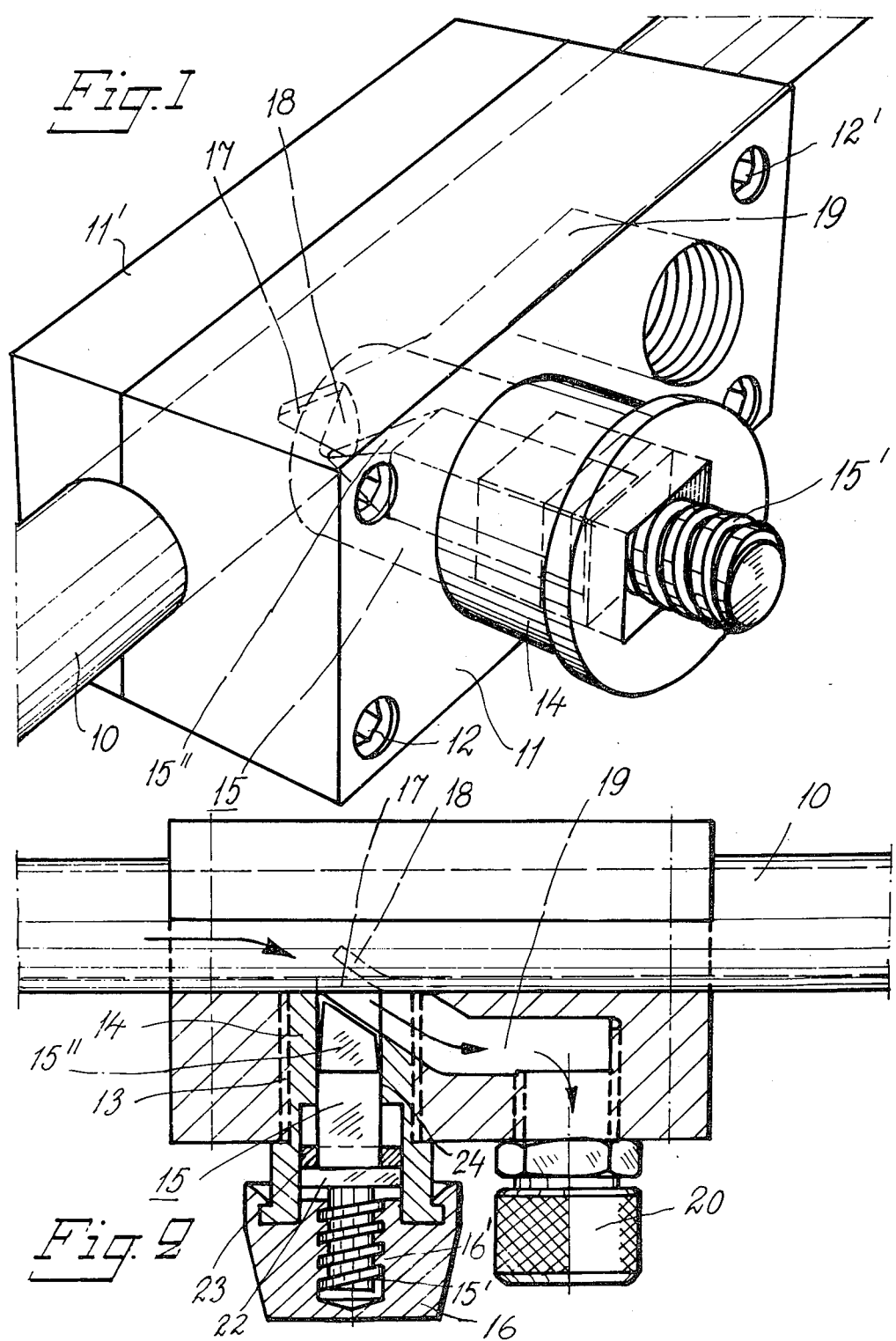

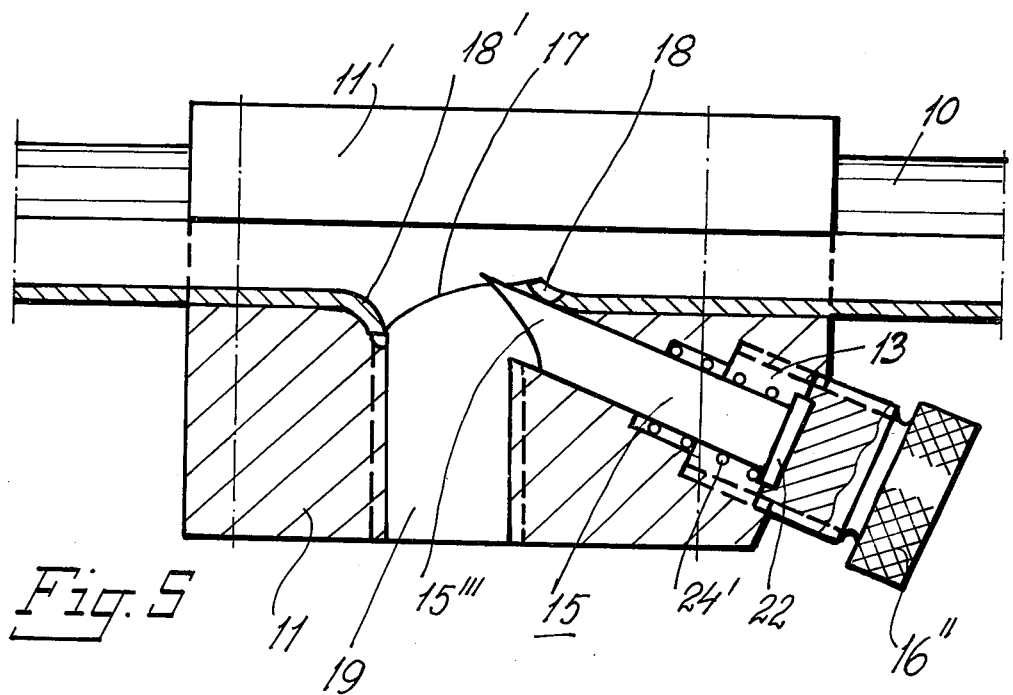

PIPE CONNECTING DEVICE

This is a continuation of application Ser. No. 481,471, filed June 20, 1974, now abandoned.

FIELD OF THE INVENTION

This invention relates means for effecting crosswisely extending pipe connections at a transport pipe, preferably for the transport of temperate fluid, gas or similar media to radiators and other objects.

BACKGROUND AND PRIOR ART RELATED TO THE INVENTION

In previously known methods and pipe connections intended for pipe connection between the feeding and-/or return flow pipes and radiators, the work involved has been time consuming and complicated, mainly since it is extremely difficult to match the pipe connections of the radiators with the feeding and return flow pipes for temperate and circulating water is a closed circuit hot water system. The feeding and return flow pipes are, as a rule, first attached to the wall surfaces in a building, whereafter the radiators are fixed and connected to said pipes, which are arranged with pipe connection means, fitted prior to the attachment of the pipes. The position of the radiators are thus predetermined in relation to said pipe connection means and it is most difficult to alter these predetermined positions, which often can be necessary. When using previously known methods and pipe connection means, it is necessary to arrange separate valves for fluid flow adjustment and flow restricting purposes in various positions in the pipe system, to enable adjustment of the fluid flow rate. These valves are very expensive to purchase and install.

SUMMARY OF THE INVENTION

The pipe connection means, according to the present invention, makes it is possible to accomplish pipe connections effectively and speedily in any desired position along already attached feeding and return flow pipes, which means that the connection pipes for the radiators can be arranged in relation to the fixed position of the radiators. Furthermore, the pipe connection means make it possible to adjust the fluid flow without the use of separate valves for flow adjustment and restriction, thus considerably reducing the cost of equipment purchase and installation.

The present invention provides crosswisely extending pipe connections at a transport pipe for fluid, gas or similar mediums and is mainly characterized in, that seizing the transport pipes, at suitable distances along the length, are arranged pipe connection means, each one being connectable to one or more connection pipes, each pipe connection means being arranged with one or more flow channels to the connection pipes and a guiding channel to the transport pipe, in which guiding channel a hole piercing member is inserted and under the influence of an applied force creates a hole in the transport pipe, said hole piercing member being connected to a maneuverable adjusting member arranged to move the piercing member in the guiding channel in directions to and from the transport pipe, the edge portion of the hole in the transport pipe serving as a valve seat and one end portion of the hole piercing member serving as a valve face, acting against said valve seat.

The invention is further characterized in, that the hole piercing member is arranged to create the hole through the transport pipe under the influence of explosive power, and that the hole in the transport pipe is pierced in such a way that a downwardly inclined guiding member is created by the inside surface of the transport pipe.

The pipe connection means is arranged for a sealed contact with a transport pipe for fluid, gas or similar mediums, and is mainly characterized in, that the pipe connection means is arranged with one or a number of flow channels leading to connection pipes and a guiding channel leading to the transport pipe, said guiding channel being arranged with a hole piercing member, by means of which a hole into the transport pipe can be created.

The pipe connection means according to the present invention is further characterized in, that the hole piercing member is connected to a maneuverable adjusting member arranged to move the piercing member in the guiding channel in directions to and from the transport pipe, the edge portion of the hole in the transport pipe serving as a valve seat and one end portion of the hole piercing member serving as a valve face, acting against said valve seat.

A further characteristic feature of the pipe connection means according to the present invention is, that the flow channels are arranged to extend from the part of the guiding channel direct towards the transport pipe to the outer portion of the pipe connection means, where attaching means for the connection pipes are arranged.

BRIEF DESCRIPTION OF THE DRAWINGS

The pipe connection means according to the present invention is more fully described below with reference to the accompanying drawings.

FIG. 1 is a perspective view of an embodiment of the pipe connection means with a part of the flow adjusting member, the pipe connection means being arranged at a transport pipe.

FIG. 2 is a view, partly in cross-section, of said embodiment, showing the flow adjusting member and a connection member for the connection of a pipe.

FIG. 5 is a longitudinally extending view, partially in cross-section of a further modified embodiment of the pipe connection means, the guiding channel and the hole piercing member being arranged at an inclined angle in relation to the longitudinal axis of the transport pipe.

DESCRIPTION OF PREFERRED EMBODIMENTS

At 10 is a transport pipe, embracing which is a number of pipe connection means can be arranged at a suitable distance from each other in a sealed connection to the pipe.

Figure 3:
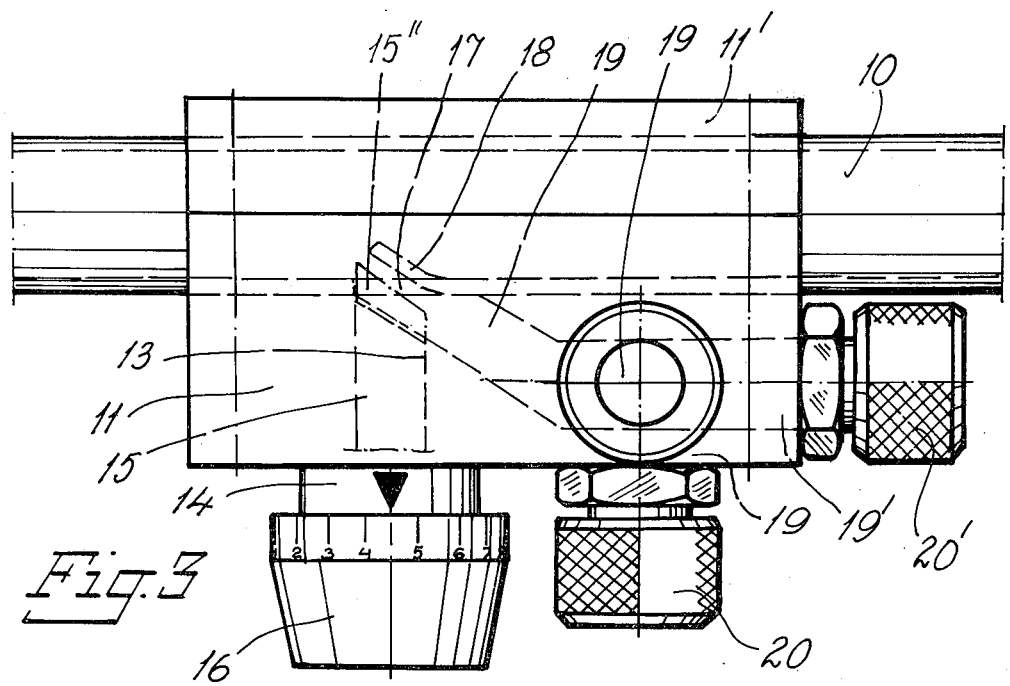
FIG. 3 is a view of a modified embodiment, including three flow channels arranged to lead to three outside surfaces of the pipe connection means and having three connection members for the attachment of pipes.

Each pipe connection means comprises two joinable connection halves 11 and 11' of steel, metal, a synthetic plastic material or any other suitable material, one of the aforementioned halves 11 having a considerably larger volume than the other connection half 11'. The connection halves 11, 11' are joined together, embracing the transport pipe 10, by means of screws 12, 12'; but also other means can be used for this attachment. As a sealing member against the transport pipe 10 sealing compounds, elastic gaskets or similar means can be used. In the larger connection half 11, a guiding channel 13 is arranged as a through hole directed towards the transport pipe 10, having a tubular guiding member 14 fixed by means of a screw thread. In said tubular guiding member 14 is a slidably-arranged hole piercing member, indicated generally at 15. As shown in FIGS. 2 and 3, the tubular guiding member 14 is arranged with a wheel-shaped adjusting member 16 at the free end portion, having a marking for graduation purposes. The longitudinally extending hole piercing member 15 is at one end portion arranged with a screw thread 15', which can interlock with a screw thread arranged in the wheel-shaped adjusting member 16, whereby the hole piercing member 15 is moved in the tubular guiding member 14, when the adjusting member 16 is rotated. The opposite end portion 15'' of the hole piercing member 15 is arranged with a cutting member 15'' for the creation of a hole 17 through the wall of the transport pipe 10. Every hole 17 formed in the transport pipe 10 is arranged with a guiding member 18, inclined towards the center axis of the transport pipe 10 and formed from the pipe material moved to create the hole 17.

In the larger pipe connection half 11 is arranged one or a number of flow channels 19, 19', 19'', which at least one flow channel 19 extends from and communicates with the guiding channel 13, at the end portion directed towards the transport pipe 10. The remaining flow channels 19', 19'' can communicate with and extend from the flow channel 19. Each flow channel 19, 19', 19'' terminates at one of the outside surfaces of the larger connection half 11, said channels 19, 19', 19'' outer portions being arranged with means of connection, e.g. a screw thread, for connection members 20, 20' for connection pipes 21 to radiators or similar objects. In the aforementioned pipe connection half 11 the guiding channel 13 is directed perpendicular in relation to the longitudinal axis of the transport pipe 10, and the hole piercing member 15 is arranged to press out the hole 17 in the transport pipe 10 by means of an influence created by strokes, pressure or an explosion; the hole cutting portion 15'' of the hole piercing member 15 preferably being of an inclined shape and serving as a movable valve face, which can take up a sealing position against the edge of the hole 17 and the guiding member 18, which together form a valve seat. The hole piercing member 15, the hole 17 and the guiding member 18 thus together form a valve for adjustment of the flow from the transport pipe 10 to the connection pipes 21. The influence of a force applied to the hole piercing member 15 for creation of the hole 17 in the transport pipe 10, is obviously applied to the free end portion 15' of the hole piercing member 15, and in the longitudinal axis of same, before the wheel-shaped adjusting member 16 is attached to the aforementioned free end portion 15' and the tubular guiding member 14. As shown in FIG. 2, the hole piercing member 15 is arranged with a circular flange 22 in contact with the inside of the tubular guiding member 14, and against said flange is arranged a sealing and supporting ring 23, acting against the inside of the tubular guiding member 14, which, when the hole piercing member 15 is moved towards the transport pipe 10, acts as a stop member against a part with reduced diameter 24 in the tubular guiding member 14, in order to prevent the hole piercing member 15 to move past a fixed position. Between the inside of the tubular guiding member 14 and the hole piercing member 15, elastic sealing gaskets can also be arranged.

Figure 4:
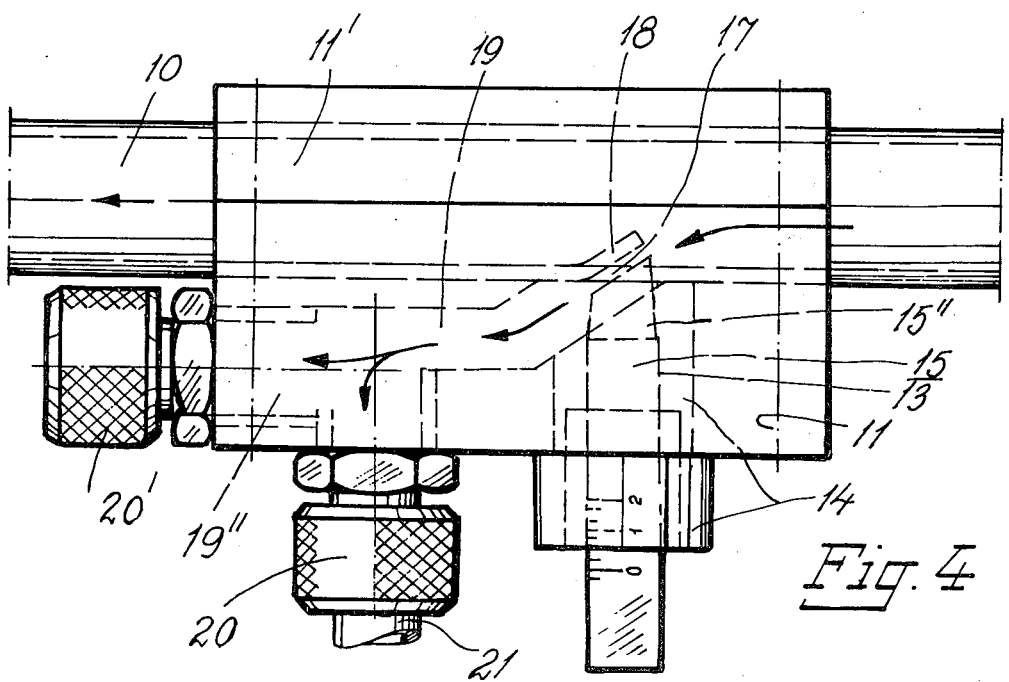
FIG. 4 is a view of a further modified embodiment of the pipe connection means, having two flow channels arranged to lead to two outside surfaces of the pipe connection means and a flow adjusting member of a different type than previously shown in FIGS. 2 and 3.

As shown in FIG. 4, the hole piercing member 15 can be arranged with positioning marks at the free end portion, instead of the wheel-shaped adjusting member 16. Also other types of previously known means for adjustment can be used.

In the modified embodiment of the pipe connection means 11, 11' shown in FIG. 5, the guiding channel 13 for the hole piercing member 15 is arranged at an acute angle in relation to the longitudinal axis of the transport pipe 10. The cutting end portion 15''' of the hole piercing member 19 is wedge-shaped, whereby a planing or shaving action is acheived, when a force is applied to the free (outer) end portion of the hole piercing member 15 for forming the hole 17 in the transport pipe 10. According to this embodiment, an inwardly directed guiding member 18 and an outwardly directed guiding member 18' are formed in the transport pipe 10 at the edge of the hole 17. Further, a tubular guiding portion is arranged with a helical spring 24', acting against flange 22 of the hole piercing member 15, and the adjusting member 16'' is arranged to act on the hole piercing member 15. This is a very suitable embodiment in connection with transport pipes of a relatively soft material, e.g. copper.

Power influence by means of explosion impact can be created using bolt or nail impact guns, whereby the force can be adjusted in relation to the material and thickness of the transport pipe.

Since the cutting portion 15'', 15''' of the hole piercing member is slightly inclined, it will always assume a sealing contact with the edge of the hole 17 and the guiding member 18 or the guiding members 18, 18'. The guiding member 18 or 18' having a guiding effect or valve effect on flow, e.g. a water flow, from the transport pipe 10.

The main features of the invention are, that holes can be created speedily and cheaply in the transport pipe, and that the hole piercing member 15 in combination with the hole 17 form an effective valve for flow adjustment and complete restriction of the flow, whereby separate valve members no longer are necessary, thus considerably reducing the installation costs from what has been previously possible.

The present invention also concerns further modifications of the pipe connection means, within the framework of the invention and the following claims.

I claim:

1. A pipe connection means for crosswise-extending pipe connections to transport pipes for fluid, gas or similar media, said pipe connection means including at least one flow channel intersecting the transport pipe and directed towards a connection pipe, and a guiding channel directed towards the transport pipe, said guiding channel including a hole-cutting, piercing member movable in said guiding channel to pierce the transport pipe adjacent the intersection of said flow channel with said transport pipe and create a hole through said transport pipe, said piercing member being connected to a maneuverable adjusting member arranged to move the hole piercing member in the guiding channel in directions to and from the transport pipe, edge portions of the hole forming a valve seat, the hole piercing member having an end portion functioning as a valve element and acting against said valve seat, the guiding channel being arranged at an acute angle in relation to the longitudinal axis of the transport pipe, the end portion of the hole piercing member functioning as a cutting member and being arranged to cut out and form an inwardly directed guiding member and an outwardly directed guiding member when moved in a direction towards the transport pipe and therethrough, said guiding members, in connection with the edge portions of the hole, forming said valve seat and the cutting part of the piercing member forming the valve element.

* * * * *